United States Patent [19]
Nettles

[11] 3,849,674
[45] Nov. 19, 1974

[54] SIGNAL COMPARATOR CIRCUIT FOR ANALOG CONTROL SYSTEMS

[75] Inventor: Robert G. Nettles, Goshen, Ind.

[73] Assignee: Johnson Service Company, Milwaukee, Wis.

[22] Filed: Mar. 16, 1973

[21] Appl. No.: 342,000

Related U.S. Application Data

[60] Continuation of Ser. No. 204,510, Dec. 3, 1971, abandoned, which is a division of Ser. No. 106,650, Jan. 15, 1971, Pat. No. 3,742,327.

[52] U.S. Cl.............. 307/253, 307/235, 307/296, 330/30 D
[51] Int. Cl. ........................................ H03k 17/00
[58] Field of Search....... 307/254, 253, 252 W, 235, 307/296; 330/30 D; 318/227, 678

[56] References Cited
UNITED STATES PATENTS

| | | | |
|---|---|---|---|
| 3,183,425 | 5/1965 | Slawson | 318/227 |
| 3,252,067 | 5/1966 | Derenbecher, Jr. | 318/678 |
| 3,281,593 | 10/1966 | Mendelsohn | 307/254 X |
| 3,529,182 | 9/1970 | Jornord | 307/284 |

Primary Examiner—Rudolph V. Rolinec
Assistant Examiner—B. P. Davis
Attorney, Agent, or Firm—Johnson, Dienner, Emrich, Verbeck & Wagner

[57] ABSTRACT

A signal comparator circuit for use in heating and air conditioning systems to control selective rotation of a motor shaft which positions a damper or a valve including a differential amplifier responsive to a potential difference between a signal provided by a sense potentiometer representing the desired position for the damper, and a signal provided by a command potentiometer representing the actual position of the shaft to effect energization of one of a pair of motor windings to rotate the shaft, the energized one of the pair being determined by the polarity of the difference signal, the sense potentiometer being linked to the motor shaft so that the difference between the command signal and the sense signal decreases as the shaft rotates to the desired position and the motor is deenergized when the desired shaft position is reached.

7 Claims, 4 Drawing Figures

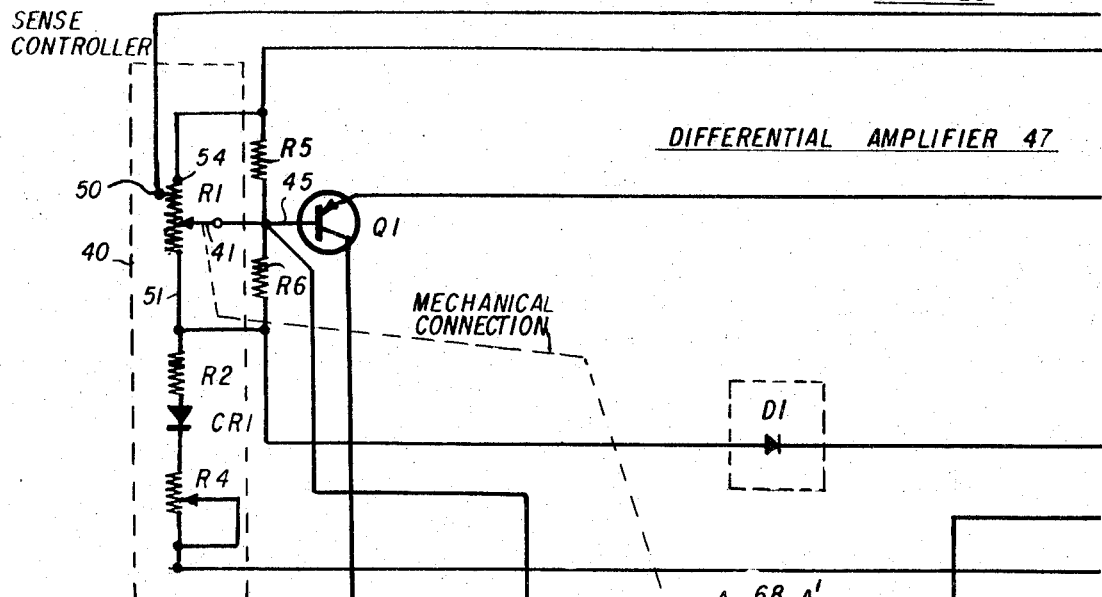
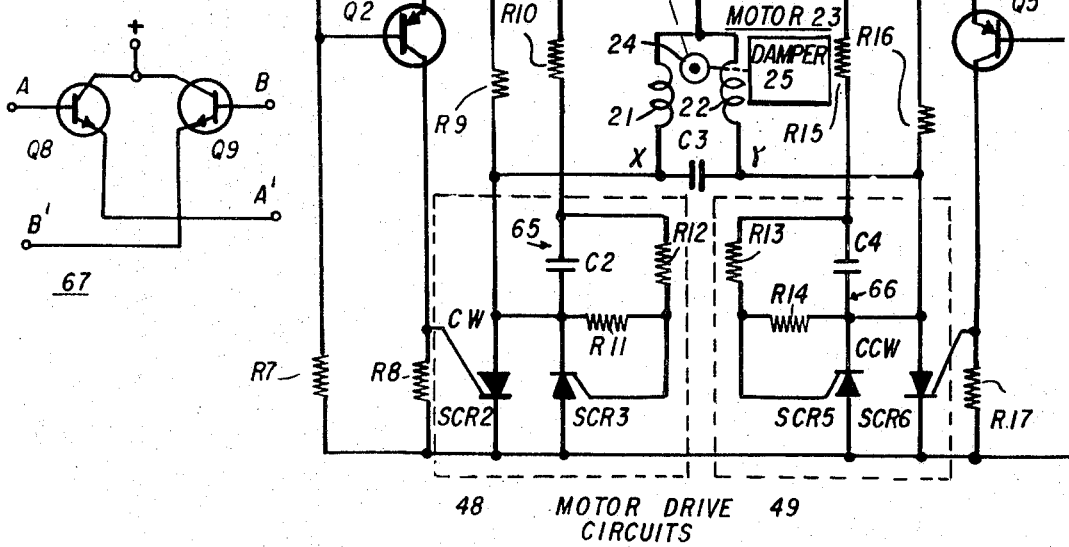

SIGNAL COMPARATOR CIRCUIT FOR ANALOG CONTROL SYSTEMS

This is a continuation of application Ser. No. 204,510, filed Dec. 3, 1971, now abandoned, which is a division of Ser. No. 106,650 filed Jan. 15, 1971, now U.S. Pat. No. 3,742,327.

BACKGROUND OF THE INVENTION

1. Field of the Invention

This invention relates to analog control systems, and more particularly, to a signal comparator circuit for use in such systems which is responsive to a linearly changing input signal to provide a discrete output signal whenever the amplitude of the input signal exceeds a predetermined value.

2. Description of the Prior Art

In analog control systems, a monitoring device is used to continuously monitor a physical characteristic of a system and provide an electrical analog signal representing the current value of the characteristic. Such systems generally include comparator means for comparing the analog signal with a signal representing a desired or set point value for the characteristic. When the compared values differ by a predetermined amount indicating a deviation from the desired value, a control output signal provided by the comparator means controls system apparatus to compensate for the deviation.

For example, in heating and air conditioning systems, analog signals may be derived through the use of a monitoring device, such as a bimetallic element, a diaphragm, bellows, etc., which continuously monitors a selected characteristic of the system, such as temperature or steam pressure, and provides analog signals as inputs to a motor actuator circuit which includes a signal comparator means for controlling operation of a motor.

The motor shaft is connected to drive a damper located in an air duct, or a valve connected in a hot water or steam line, such that controlled operation of the motor effects changes in the system characteristic being monitored thereby compensating for the error detected.

To provide such compensation, the motor shaft must be rotatable in a clockwise or a counterclockwise direction within a predetermined range, and the error signal, which is the difference between the analog signal and the setpoint signal, must indicate the amount and direction of rotation needed to move the shaft, and correspondingly a damper or valve, to a desired setting. Accordingly, some prior art motor actuator circuits have used electromechanical balance relays which sense both the amplitude and phase or polarity of the analog signal provided by the monitoring device and control the energization of the motor winding via relay contacts. However, switching of the large inductive currents required to energize the motor winding causes undesirable arcing and burning at the contacts. Moreover, control circuits employing relays are subject to line fluctuations and power dissipation in the relay coil.

Solid state switching circuits have been proposed for use in control circuits to avoid the need for mechanical contacts and to minimize power dissipation. However, such solid state switching circuits may generally employ linear differential amplifiers to amplify the error signal. Since such amplifiers provide a linear output within a small range, means must be provided to determine when the error signal has reached the level at which energization of the motor drive circuit is desired.

SUMMARY OF THE INVENTION

The present invention provides a novel signal comparator means for use in a motor actuator circuit for comparing a first input signal with a second input signal and providing a first output signal whenever the difference between the compared signals is less than a predetermined threshold value and a second output signal whenever the difference between the compared signals is equal to or greater than the threshold value. The signal comparator means effects selective energization of windings of a two phase motor to control the positioning of the motor shaft in accordance with input signals supplied to the signal comparator means.

In one embodiment of the invention, the comparator means comprises a D.C. differential amplifier circuit including an input stage having a first input connected to a command means which provides a command signal representing the desired position for the motor shaft. A second input of the differential amplifier circuit is connected to position sensing means which provides a sense signal representing the actual position of the shaft.

In a balanced condition, that is when the shaft is in the desired position, the command and sense signals input to the differential amplifier circuit are equal. In an unbalanced condition, when the shaft is not in the desired position, one of the signals input to the differential amplifier circuit will be greater than the other input signal, and the comparator means will be operable to effect energization of motor drive circuits to cause rotation of the shaft to the desired position. An inherent feature of the differential amplifier comparator means provided by the present invention is that the amplitude of one of the input signals must exceed the amplitude of the other input signal by a predetermined amount before the motor drive circuit will be energized. Thus, the comparator means provided by the present invention inherently determines when the difference between the signals input to the comparator means has reached the level to effect energization of the motor drive circuits.

The differential amplifier circuit further comprises an output stage including first and second output switching transistors inversely connected to the input stage transistors such that when one of the input signals to the differential amplifier circuit is greater than the other input signal, one output transistor is forward biased and the other output transistor is reversed biased. A drive circuit associated with the forward biased transistor will be enabled to effect energization of one of the windings of the motor and the drive circuit associated with the reverse biased transistor will be disabled.

Thus, when the amplitude of the command signal is greater than the amplitude of the sense signal, one drive circuit will be enabled to effect energization of one of the windings, and when the amplitude of the command signal is less than the amplitude of the sense signal, the other drive circuit will be enabled to effect energization of the other motor winding.

The position sense means are controlled by the motor shaft to provide a sense signal that is proportional to the shaft position such that once the motor is energized the shaft will be rotated until the sense signal provided is equal to the command signal, at which time the motor drive circuits will be deenergized. The motor windings will be energized until the wiper of the sense potentiometer has been moved sufficiently to overcome the change in potential at the controller potentiometer resulting from the command monitoring device.

BRIEF DESCRIPTION OF THE DRAWINGS

FIGS. 2 and 3 which when assembled in side by side relationship illustrate a schematic circuit diagram of the motor actuator circuit shown in block form in FIG. 1; and FIG. 4 is a schematic circuit diagram of a circuit for connection into the actuator circuit shown in FIGS. 2 and 3 providing an alternative embodiment for the differential amplifier of the actuator circuit.

DESCRIPTION OF PREFERRED EMBODIMENTS

General Description

Figure 1:
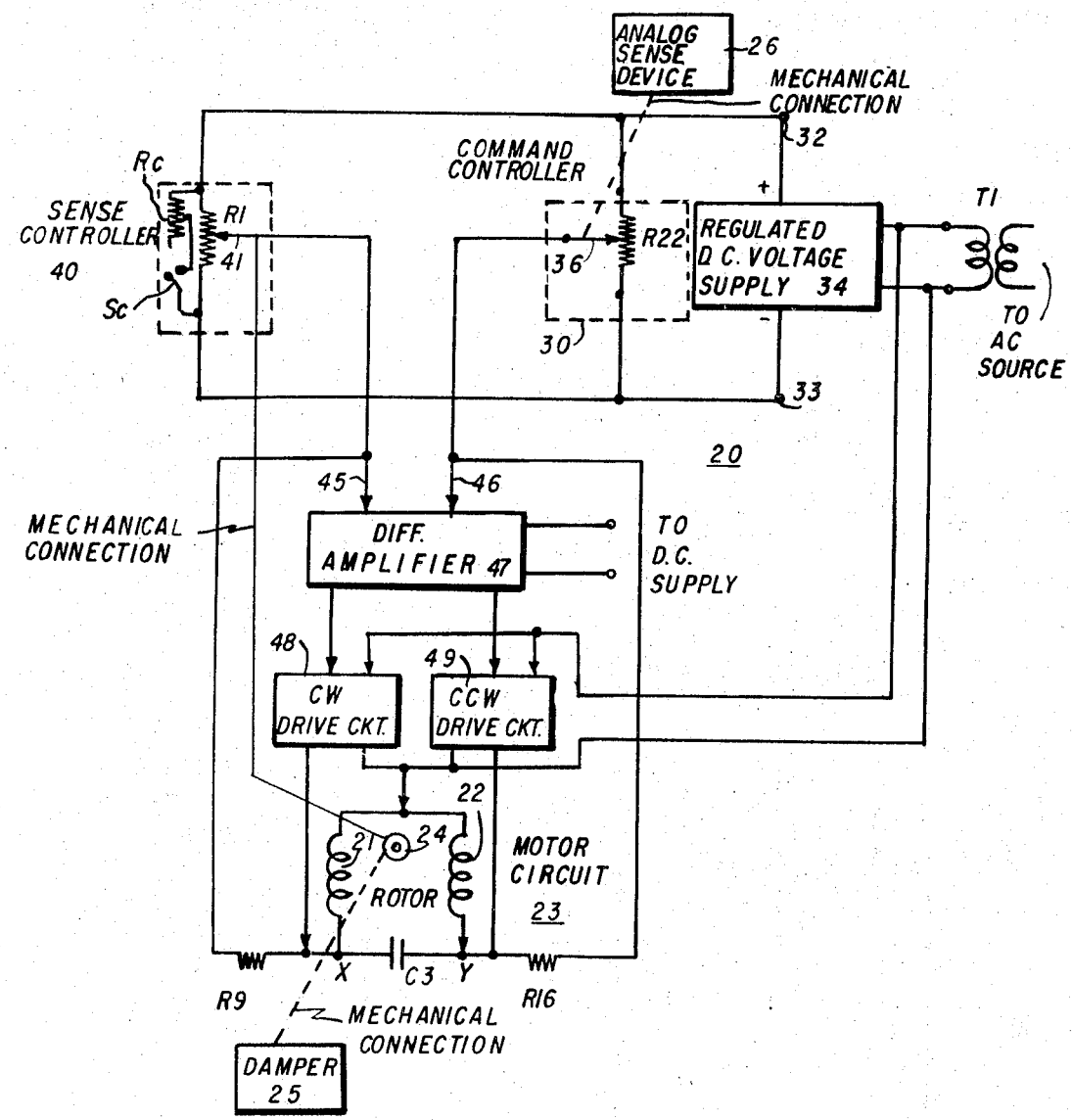
FIG. 1 is a block diagram of a motor actuator circuit provided by the present invention.

Referring to FIG. 1, the novel comparator circuit 47 provided by the present invention is described with reference to an application in a motor actuator circuit 20. As there shown, the actuator circuit 20 is used to effect selective energization of windings 21 and 22 of a motor 23 to rotate the shaft or rotor 24 of the motor to a desired position.

For example, in a temperature conditioning system the motor may provide controlled positioning of a damper 25, driven by the motor shaft 24, as a function of a command provided to the motor actuator circuit 20 by way of an analog sensing device 26 which monitors the temperature at one location within the temperature conditioning system.

The motor actuator circuit employs D.C. sensing to compare signals provided by command controller means 30 and sense controller means 40 to effect positioning of the motor shaft.

In FIG. 1, command controller means 30 controlled by analog sensing means 26 include a potentiometer R22 connected between the output terminals 32 and 33 of a regulated D.C. voltage source 34 which derives a D.C. voltage from a 60HZ, 110 volt A.C. power line coupled through transformer T1. The wiper 36 of potentiometer R22 is mechanically connected to the sensing device 26 and movable thereby such that the D.C. potential at wiper 36 of the command potentiometer R22 represents the desired position of the motor shaft 24 which position is a function of the temperature monitored by the analog sensing device 26.

Shaft position sensing controller means 40 includes sense potentiometer RI connected between the output terminals 32 and 33 of the voltage source 34 in parallel with the command controller means 30. The wiper 41 of feedback potentiometer RI is mechanically connected to the motor shaft 24 and movable thereby such that the D.C. voltage at wiper 41 represents the actual position of the motor shaft 24 (and the position of the damper 25 driven by the motor shaft).

The wipers 41 and 36 of potentiometers RI and R22, respectively, are extended to inputs 45 and 46 of comparator circuit means comprising a novel D.C. differential amplifier 47 so that the potentials representing the actual shaft position (wiper 41) and the desired shaft position (wiper 36) can be compared. When the potentials at amplifier inputs 45 and 46 are equal, the shaft is in the desired position. When the potentials at amplifier inputs 45 and 46 are not equal due to movement of wiper 36 of the command potentiometer by the sensing device 26, and the potential difference between the voltages at inputs 45 and 46 is in excess of a predetermined threshold value, the differential amplifier will provide an enabling signal for drive circuit 48 which is operable when enabled to effect energization of motor winding 21 and provide clockwise rotation of the shaft 24, or for drive circuit 49 which is operable when enabled to effect energization of motor winding 22 and provide counterclockwise rotation of the shaft. The direction of rotation required to move the shaft toward the desired position is determined by the differential amplifier 47 which senses the polarity of the potential difference appearing between inputs 45 and 46 of the amplifier.

The motor shaft 24 rotates so long as the windings 21, 22 are energized through a drive circuit and as the shaft rotates, wiper 41 of the sense potentiometer RI is moved, causing the potential at wiper 41 and correspondingly at input 45 of the amplifier to increase or decrease. If, for example, the potential at wiper 36 of the command potentiometer (and at input 46 of the differential amplifier) is increased until the potential difference between amplifier inputs 45 and 46 exceeds the threshold, an enabling signal will be provided by the amplifier 47 for enabling drive circuit 49 to effect energization of winding 22 with 24 volt A.C., while winding 21 is placed in series with capacitor C3 in parallel with winding 22. So long as drive circuit 49 remains enabled, the shaft 24 will rotate counterclockwise moving the damper 25 to compensate for the change indicated by the sensing device 26, and moving the wiper 41 of sense potentiometer RI so that the potential at wiper 41 (and at input 45) will be increased as the shaft is rotated, until the potential difference between amplifier inputs 45 and 46 is less than the threshold value. At such time, the drive circuit enabling signal will no longer be provided by the differential amplifier 47 and the energized motor windings 22, 21 will be deenergized.

Detent means including resistor R9 connected between winding 21 and amplifier input 45 and resistor R16 connected between winding 22 and amplifier input 46 provide a detent signal for increasing the potential difference between amplifier inputs 45 and 46 whenever the windings 21, 22 are energized. For example, whenever winding 21 is energized, the voltage appearing across the other winding 22 is fed back over resistor R16 to input 46 of the amplifier 47. Consequently, the sense signal provided by the sense controller 40 must overcome both the change in potential provided by the command controller 30 and the detent signal before the potential difference between amplifier inputs 45 and 46 becomes less than the threshold value. A more complete description of the operation of the motor actuator circuit and more particularly of the novel signal comparator means 47 and detent features of the invention are set forth in the following detailed description.

Detailed Description of Preferred Embodiments

Figure 3:
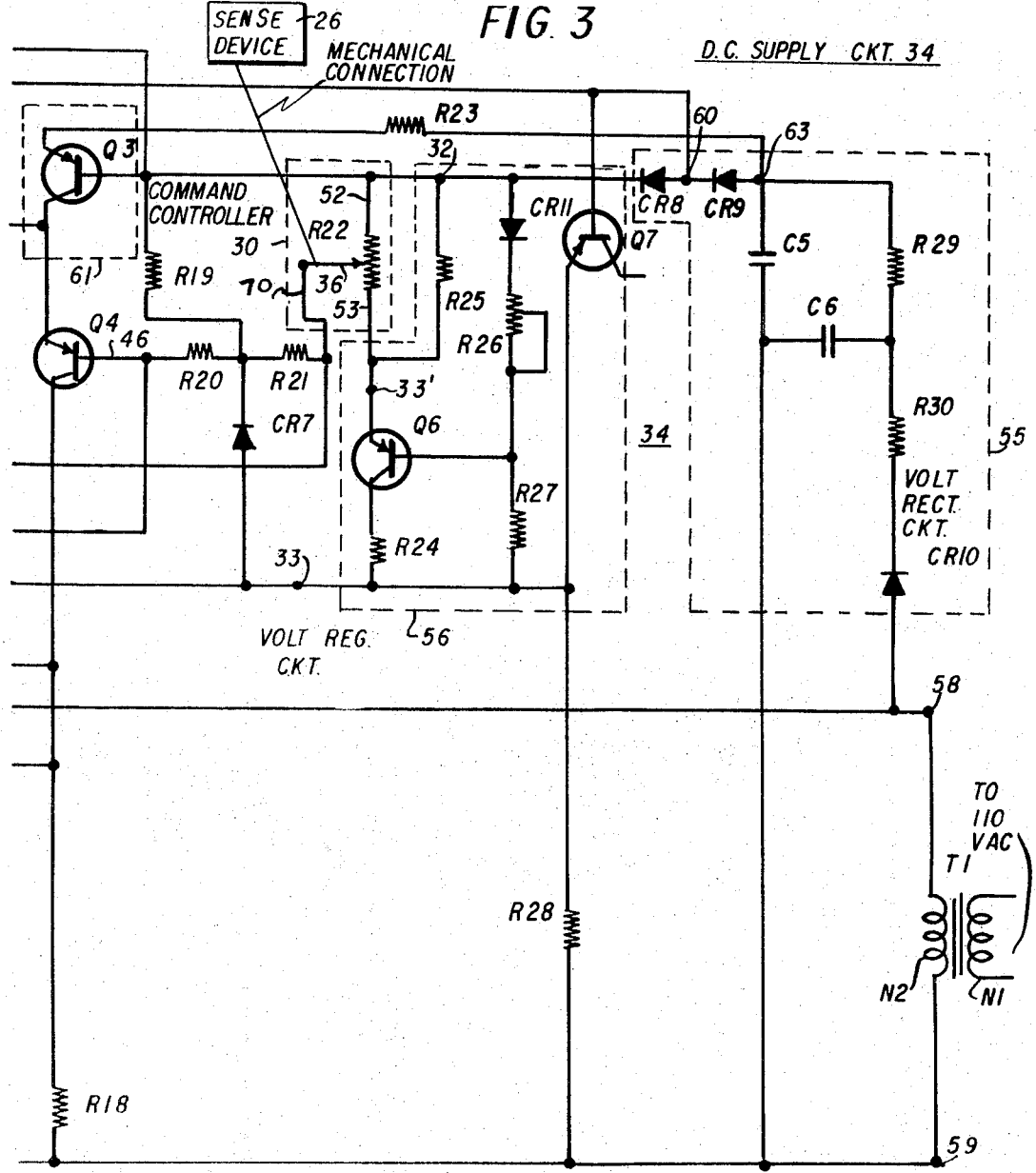

Referring to the detailed circuit schematic diagram of the actuator circuit shown in FIGS. 2 and 3, the sense controller means includes a sense potentiometer RI having a tap 50 connected to output terminal 32 of a D.C. voltage supply 34 and a terminal 51 connected over a resistor R2, a diode CRI and a travel limit adjust potentiometer R4 to output terminal 33 of the voltage supply 34. The command controller means 30 includes a command potentiometer R22 having a terminal 52 connected to supply output terminal 32 and a terminal 53 connected to supply output terminal 33'.

As shown in FIG. 3, the D.C. supply 34 includes a voltage rectifier circuit 55 which provides a halfwave rectified D.C. voltage between output terminals 32 and 33 of the D.C. voltage supply. The D.C. voltage is derived from a 110 volt, 60 Hz signal coupled to the motor actuator circuit through an input transformer TI which has a primary winding NI connected to an A.C. source. The secondary winding N2 of transformer TI has one end at terminal 58 connected over a unidirectional current path of the voltage rectifier circuit 55 comprising rectifier diode CRIO, a filter network including current limiting resistors R29, R30 and filter capacitors C5, C6 and diodes CR8, CR9 to output terminal 32. The other end of winding N2 at terminal 59 is connected over resistor R28 to output terminal 33.

The D.C. supply 34 further comprises a voltage regulator circuit including transistors Q7 and Q6. The base of transistor Q7 is connected at point 60 to terminal 54 of sense potentiometer RI and through diode CR8 to output terminal 32 of the voltage supply, and the emitter of transistor Q7 is connected to terminal 33. Transistor Q7 acts as a Zener diode to provide a stabilized voltage +V across output terminals 32 and 33 which voltage appears across the sense controller means 40. Transistor Q6 and associated bias resistors R24-R27 provide further regulation for the rectified D.C. voltage and also connect one end of the command potentiometer R22 at terminal 33' to output terminal 33 of the voltage supply, so that only, say, one-third of the regulated output voltage +V appears across the command controller potentiometer R22. It should be noted that command controller 30 provides the input command signal to the actuator circuit and may be remotely located therefrom. In fact, all that is required is a controller which provides an input D.C. signal across terminals 32 and 70.

Signal Comparator Circuit

The amplitudes of the D.C. sense signal provided at the wiper 41 of feed back potentiometer RI and the D.C. command signal provided at wiper 36 of the command potentiometer R22 are compared by the D.C. differential amplifier 47. The differential amplifier includes an input stage including transistors Q1 and Q4, both biased to be normally conducting, and an output stage including output switching transistors Q2 and Q5, both normally turned off. The switching of transistors Q2 and Q5 is controlled by transistors QI and Q4 as a function of the potential present at the differential inputs 45, 46 of the amplifier 47.

The base of transistor QI, which serves as one input 45 to the amplifier, is connected to wiper 41 of the feed back potentiometer RI, and over bias resistor R5 to the D.C. supply 34 at point 60. The collector of transistor QI is connected through resistor R7 to terminal 59.

The base of transistor Q4 which serves as a second input 46 to the differential amplifier 47 is connected through resistors R20 and R21 to wiper 36 of command potentiometer R22 and over bias resistor R19 to terminal 32 of the voltage source 34. The collector of transistor Q4 is connected through resistor R18 to terminal 59.

The emitters of transistors QI and Q4 are connected to the collector of transistor Q3 which comprises a constant current source 61 for supplying emitter current to the emitters of transistors QI and Q4. The base of transistor Q3 is connected to terminal 32 of the voltage source, and the emitter of transistor Q3 is connected over resistor R23 to the point 63 of the power supply circuit 34 such that forward bias is provided for the transistor Q3 by diodes CR8 and CR9.

When the input voltages supplied by the sense and command controllers are equal, transistors QI and Q4 will share the current from the current source 61 equally and the voltages at the collectors of transistors QI and Q4 will be equal. However, when the input voltages are unequal, current division, and consequently the collector voltages, are unequal so that a differential voltage proportional to the difference in the input voltage exists between the collectors of transistors QI and Q4. This differential voltage is applied to the base-emitter circuits of transistors Q2 and Q5 which circuits are reversely connected between the collectors of transistors QI and Q4 such that when the voltage at the collector of transistors QI is more positive than the voltage at the collector of transistor Q4 (by an amount exceeding the minimum turnon voltage Vbe min. of transistors Q2 and Q5) the base-emitter circuit of transistor Q5 which s connected between the collector of transistor Q4 and the collector of transistor QI is forward biased, and the base-emitter circuit of transistor Q2 which is connected between the collector of transistor Q2 and the collector of transistor Q4 is reverse biased. In such case, transistor Q5 would be turned on and transistor Q2 would remain turned off.

Conversely, if the voltage at the collector of transistors QI is negative relative to the collector of transistor Q4, the base emitter circuit of transistor Q5 would be reverse biased and the base emitter circuit of transistor Q2 would be forward biased.

Motor Drive Circuits

Whenever transistor Q2 is forward biased, an enabling signal is provided at the collector of transistor Q2 to enable output drive circuit 48 comprised of silicon controlled rectifiers SCR2 and SCR3 which, when triggered on, connect the motor winding 21 between terminals 58 and 59 for energization by A.C. currents provided over transformer TI. The switching devices SCR2 and SCR3 are connected in inverse parallel to permit full wave conduction of the energizing A.C. signals.

One end of motor winding 21 is connected directly to terminal 58 and the other end of winding 21 is connected over the anode cathode circuit of SCR2 to terminal 59. The gate of SCR2 is connected to the collector of output transistor Q2 for receiving an enabling gate signal therefrom for triggering the SCR2 into conduction. When enabled, SCR2 conducts during the positive half of cycles of the power signals permitting A.C. current to flow from terminal 58 through winding 22 and SCR2 to terminal 59. The second switching device SCR3 has its anode-cathode circuit connected in inverse parallel with SCR2 for conducting the A.C. current during negative half cycles of the power signal. The gate signal for SCR3, for turning SCR3 on during the negative half cycles of the power signal is provided by a timing network 65 connected to the gate of SCR3, including resistors R10–R12 and capacitor C2 which network is connected in parallel with winding 21 such that capacitor C2 charges during each positive half cycle of the power signal, and discharges as SCR2 becomes cut off by the negative going power signal, triggering SCR3 into conduction.

The drive circuit 49 controlled by output switching transistor Q5 for effecting energization of winding 22 is similar to drive circuit 48 and includes inverse connected silicon controlled rectifiers SCR5 and SCR6, respectively operable when enabled to connect one end of motor winding 22 to terminal 59 during alternate half cycles of the power signal, the other end of the winding being connected to terminal 58. The gate of SCR6 is connected to the collector of output transistor Q5 for receiving an enabling gate signal therefrom, and the gate of switching device SCR5 is connected to a timing network 66 comprising a capacitor C4 and resistors R13–R15 which provides a gate signal for SCR5. It is pointed out that SCR6 (or SCR2) is enabled to energize winding 22 (or 21) only at the concurrent presence of a gate drive signal and a positive anode-cathode voltage.

The motor 23 used is commercially available 24 VAC signal phase permanent split capacitor motor. A capacitor C3 is connected between windings 21 and 22 of the motor to provide the required phase shift for operation of the motor on a single phase signal.

One end of winding 21 is connected through detent resistor R9 to the base of transistor QI at the sense input 45 of the differential amplifier to provide a detent signal whenever winding 22 is energized, which as will be shown hereinafter serves to maintain SCR5 and SCR6 conducting long enough to assure rotation of the shaft, particularly when the potential difference at the amplifier input is small.

Similarly, one end of winding 22 is connected through detent resistor R16 to the base of transistor Q4, the command input 46 of the differential amplifier for providing a detent signal whenever winding 21 is energized.

Operation of the Motor Actuator circuit

With reference to FIGS. 2 and 3, when the motor shaft 24 is at the desired position the actuator circuit is in a balanced condition and the sense signal provided to the base of transistor QI by the sense controller 40 is approximately equal to the command signal provided to the base of transistors Q4 by the command controller 30, the potential difference between the bases of transistors Q1 and Q4 is insufficient to cause either transistor Q2 or Q5 to be forward biased. Under such condition, the motor winding drive circuits 48 and 49 are not enabled, and the motor is not energized.

When a change in temperature is sensed by the analog sensing device 26, the wiper 36 of the command controller potentiometer R22 is moved an amount corresponding to the temperature change causing an increase or a decrease in the potential at wiper 36 of potentiometer R22. This change in potential indicated the direction of rotation and the amount of rotation required for the shaft to position the damper 25 to correspond to the temperature change.

It is pointed out that the voltage at wiper 36 is negative with respect to the voltage at terminal 32. Thus, if the wiper 36 is moved to increase the potential between wiper 36 and terminal 32, the potential at wiper 36 will become more negative. Accordingly, the potential at the base of transistor Q4 will become more negative so that transistor Q4 will conduct more emitter current than will transistor QI, and the collector voltage of transistor Q4 will be greater than the collector voltage of transistor QI. When the potential difference between the collectors of transistors Q4 and QI exceed Vbe minimum of transistor Q2, transistor Q2 will be forward biased and transistor Q5 will be reverse biased.

When transistor Q2 is forward biased, collector current of transistor Q2 will trigger SCR2 of drive circuit 48 into conduction so that winding 21 of the motor is connected in a circuit path including the motor winding 21 and the secondary winding N2 of the input transformer TI and the anode to cathode circuit of SCR2 for energization by the A.C. signals provided over transformer TI during the positive half cycles of the A.C. power signals. During the positive half cycles of the power signal, capacitor C2 connected in parallel with resistors RII and R12, is charged by current flowing over the series circuit comprising resistors R10–R12; connected in parallel with winding 21.

A second energizing path for winding 21 is provided over the anode to cathode circuit of SCR3 and winding N2 during the negative half cycles of the A.C. power signal, when SCR3 is triggered as capacitor C2 discharges over resistors RII, R12.

The silicon controlled rectifiers SCR2 and SCR3 of drive circuit 48 will be energized during positive and negative half cycles of the power signal, respectively, as long as output switching transistor Q2 is enabled to provide gate current for SCR2.

When clockwise winding 21 of the motor is energized responsive to the enabling of drive circuit 48, the motor shaft 24 will be moved clockwise as long as the winding 21 is energized. As the shaft moves clockwise toward the desired position as indicated by the potential at wiper 36 of command potentiometer R22, wiper 41 of the sense controller potentiometer RI which is mechanically linked to the shaft 24 will also be moved in a direction to compensate for the error indicated by the setting of the command controller potentiometer R22. Thus, while the shaft 24 is rotated clockwise to position the damper 25 as required to compensate for the change in system conditions, the potential provided at the base of transistor QI by the wiper 41 of sense potentiometer RI will approach the potential at the base of transistor Q4 provided by the command potentiometer R22. When the potential difference between the collectors of transistors Q4 and QI decreases below Vbe min. of transistor Q2 the actuator circuit will be in a balanced condition, and output transistor Q2 will be cut off such that enabling gate current will no longer be supplied to SCR2 of drive circuit 48, and clockwise winding 21 will be deenergized.

The motor 23, shown schematically in FIG. 2, runs on a single phase voltage provided from nhe A.C. source over transformer TI and extended first windings 21 or 22 of the motor via switching devices, SCR2, SCR3, and SCR5, SCR6, respectively. The motor capacitor C3 is switched in series with either winding 21 or 22 depending upon whether drive circuit 49 or 48 is enabled. When the motor is both windings 21 and 22 and the capacitor C3 are energized, but the circuit path which includes the capacitor C3 and one of the motor windings is nearly series resonance. The voltage across these reactive components is greater than the applied voltage and also shifted in phase.

In the present illustration in which the clockwise winding 21 is energized by drive circuit 48, the voltage across the other winding 22 is approximately two-thirds greater than the voltage applied to the clockwise winding 21. This voltage provides the detent signal feed back to the inputs 45, 46 of the differential amplifier 47 to enhance the unbalance caused by an error detection as indicated by the command controller 30. Feedback is provided to both inputs 45, 46, and the detent signal is the difference in amplitude of the induced voltage from that of the 24 volt line.

Thus, in the exemplary illustration, a portion of the induced voltage appearing across the counterclockwise winding 22 is fed back as detent signal via resistor R16 to the base of transistor Q4, while a lesser portion of the voltage across winding 21 is fed back via resistor R9 to the base of transistor QI.

The path for the detent signal provided (when clockwise winding 21 is energized through drive circuit 48) extends from SCRs 2 and 3, through capacitor C3, one end of winding 22 over resistor R16 to the base of transistor Q4 and through transistor Q3 in parallel with resistors R20 and R19 and through voltage rectifier circuit 55 to terminal 58 of secondary winding N2 of transformer TI and thence to the other end of the motor winding 22.

The detent signal drives the base of transistor Q4 further negative, relative to the base of transistor QI thereby increasing the potential difference between the bases of transistors QI and Q4 and correspondingly the potential difference between the collectors of transistors QI and Q4. It is pointed out that the value of resistor R16 is large relative to resistors R20 and R28 such that the detent voltage is on the order of 10 to 15 millivolts which is comparable to the threshold voltage of the differential amplifier 47 which is approximately 20 millivolts. The detent signal is A. C. and both adds and subtracts from the potential at the bases of transistors QI and Q4.

Accordingly, once SCR2 and SCR3 of drive circuit 48 are rendered conducting responsive to an enabling signal provided by transistor Q2, the detent signal will assure that the shaft 24 will be rotated enough to compensate for the change in the setting of the command potentiometer R22 and the actuator circuit will prevent "hunting" by the motor for a balanced condition for the actuator circuit.

When the motor winding 21 is energized, the shaft will rotate clockwise toward the desired position moving the wiper 41 of the sense potentiometer to decrease the potential at the base of transistor Q1 so that the potential at the base of transistor QI will approach the potential at the base of transistor Q4 and the potential difference between the collectors of transistors QI and Q4 will approach zero.

The output transistor Q2 will be cut off when the potential difference at the input to the amplifier is decreased to a value to cause the potential difference between collectors of transistor QI and Q4 to be less than the value of Vbe min. for transistor Q2, whereby transistor Q2 is cut off, effecting deenergization of the winding 21 and stopping rotation of the shaft 24 and further movement of the wiper 41 of the sense potentiometer RI. The detent signal is not provided when winding 21 is deenergized.

The operation of the motor actuator circuit to provide counterclockwise rotation of the shaft is similar to the operation of the actuator circuit to provide clockwise shaft rotation. If the opposite command signal is provided by the command controller 30, the potential at the base of transistor Q4 becomes more positive than the potential at the base of transistor QI so that the potential difference between the collectors of transistors QI and Q4 effects reverse biasing of transistor Q2 and forward biasing of transistor Q5. Accordingly, drive circuit 49 will be enabled by collector current provided by transistor Q5, rendering SCR5 and SCR6 conductive during alternate half cycles of the power signal, to connect winding 22 of the motor between terminals 58 and 59 for energization by the A.C. power signals. Detent signals derived from the voltages appearing across the motor windings 21 and 22 are fed back over resistors R9 and R16 to the bases of transistors QI and Q4 in a fashion similar to that described in the foregoing.

At the time when the A.C. line is positive with respect to terminal 59, the base-to-emitter voltage of transistor QI (the potential between input 45 and source output terminal 32) is increased due to the detent voltage derived across winding 21 and fed back to transistor QI to aid in turning SCR6 on for an additional full A.C. cycle.

When winding 22 is energized by the drive circuit 49, the motor shaft will be rotated counterclockwise, moving the wiper 41 of feed back potentiometer RI to provide a feed back signal for increasing the potential at the base of transistor QI until the potential difference between the bases of transistors QI and Q4 is decreased below the threshold value of the differential amplifier 47 at which time the drive circuit 49 is disabled and motor winding 22 deenergized.

MODIFICATIONS

Over-Signal Clamping

Diode DI, connected between terminal 51 of the sense potentiometer RI and wiper 36 of the command potentiometer R22, provides a means for varying the reference point for potentiometer RI relative to the voltage source terminal such that whenever the potential at wiper 36 relative to terminal 51 exceeds the voltage required to forward bias the diode DI, diode DI conducts so that the excess voltage is applied across RI and adds to the voltage supplied by the Zener source Q7 between terminals 54 and 51 of the sense potentiometer.

Travel Limit Adjust

The travel limit adjust potentiometer R4 which is connected in series with the sense controller potentiometer RI permits motor shaft rotation over an angular range of 90° to 270°. The maximum value of variable resistance element R4 is twice the maximum value of the sense resistance element RI. Whenever potentiometer R4 is set at maximum resistance, the voltage across sense potentiometer RI is approximately one-third of the voltage across the Zener device Q7 and the motor shaft must rotate 270° to provide a sense signal which offsets the command and detent signals. If the value of resistance R4 is zero, the full Zener supply, which is three times the maximum voltage available to the command controller potentiometer R22, appears across RI and the motor shaft need rotate only one-third of the 270° range to provide a null.

Switching Transistor Drive Circuit

FIG. 4 shows an intermediate amplifier stage 67, comprising transistors Q8 and Q9, for differential amplifier 47 which comprises the comparator means. The amplifier circuit 67 has terminals A,A' and B,B' connectable to correspondingly labeled points of the differential amplifier circuit which are shown in FIG. 2 to be interconnected by links 68 and 69.

When the intermediate stage 67 is connected into the amplifier circuit 47, transistor Q8 has its base-emitter circuit connected in place of link 68 between the collector of transistor QI and the emitter of transistor Q5, and transistor Q9 has its base-emitter circuit connected in place of link 69 between the collector of transistor Q4 and the emitter of transistor Q2. The collectors of transistors Q8 and Q9 are connected to the positive terminal 32 of the voltage source.

When a positive potential difference exists between the collectors of transistors QI and Q4, transistors Q8 and Q5 will be forward biased and transistors Q9 and Q2 reverse biased. When such potential difference is negative, transistors Q9 and Q2 will be forward biased and transistors Q8 and Q5 will be reverse biased.

With the intermediate stage 67, the differential amplifier 47 provides a higher value output control signal since the input stage furnishes only the base drive current for the output transistors Q2 and Q5. The collector current for the output transistors Q2 and Q5 is provided by the intermediate stage 67.

External Controllers

Several motor actuator circuits can be slaved from one command input means, such as command controller 30. In addition, the D.C. supply voltage provided between terminal 32 and terminal 59 can be used to energize external controllers requiring an unregulated supply voltage. It is pointed out that an externally generated command signal provided by a command input means can be applied to the motor actuator circuit across terminals 70 and 32 by connecting the output of a variety of suitable controllers, such as a differential transformer or operational amplifier output, in place of the output of the controller potentiometer R22. In fact, all that is required is that a D.C. input command signal be provided by suitable command input means across terminals 70 and 32 of the activate control circuits.

The differential transformer would be controlled by sensing device, such as device 26, to provide an output representing the desired positions for the shaft.

Input Signal Characterizer

In certain installations, the device positioned by the motor shaft may have non-linear operating characteristics. For example, if the damper 25 were a valve, a linear change in the command input signal provided by the sensing device 26 would effect a linear change in the valve set point. However, a linear change in the valve set point would not provide a correspondingly linear change in the flow rate through the valve.

Therefore, as shown in FIG. 1, an adjustable characterizing resistor Rc is shown connected in series with an enabling switch Sc across the sense controller potentiometer RI permitting linearization of the valve operating characteristic.

Thus, when switch Sc is closed to connect the characterizing resistance Rc in parallel with the sense potentiometer RI, the value of resistance Rc can be adjusted to cause the control circuit to provide nonlinear changes in shaft position in response to a linearly changing command input signal, thereby compensating for the non-linear characteristic of the valve positioned by the motor and providing a linear change in flow rate for a linear change in the command input signal provided by the sensing device 26.

I claim:

1. A differential amplifier for comparing first and second input signals each of which is variable in amplitude and polarity and providing output signals which indicate amplitude and polarity differences between the compared signals, said amplifier comprising an input stage with a first input transistor having a first control electrode, and a first output electrode, and a second input transistor having a second control electrode, and a second output electrode, first means for extending to said first control electrode a first input signal which is variable in amplitude and polarity at said first control electrode, second means for extending to said second control electrode a second input signal which is variable in amplitude and polarity at said second control electrode, bias means biasing said first and second input transistors to be normally conducting for amplifying said first and second variable input signals to provide amplified signals at said first and second output electrodes, respectively, said bias means including a constant current source for supplying a constant current to said first and second input transistors such that said amplified signals provided by said input transistors establish a potential difference of one polarity between the first and second output electrodes whenever the input signal extended to the control electrode of one of said input transistors increases relative to the input signal extended to the control electrode of the other input transistor and a potential difference of the opposite polarity whenever the input signal extended to the control electrode of said one input transistor decreases relative to the input signal extended to the control electrode of the other input transistor, and an output stage including a first switching transistor having first and second input electrodes connected to said first and second output electrodes, respectively, and a second switching transistor having first and second input electrodes connected to said second and first output electrodes, respectively, and means normally reverse biasing said first and second switching transistors, one of said switching transistors becoming forward biased to provide a first output signal whenever one of said input signals increases a predetermined amount relative to the other one of said input signals such that the amplitude of the amplified signal provided at said first output electrode is a given amount greater than the amplitude of the amplified signal provided at said second output electrode, and the other one of said switching transistors becoming forward biased to provide a second output signal whenever said one input signal decreases said predetermined amount relative to said other input signal such that the amplitude of the amplified signal provided at said second output electrode is a given amount greater than the amplitude of the amplified signal provided at said first output electrode.

2. A differential amplifier as set forth in claim 1 wherein said first and second input electrodes of said first and second switching transistors comprise emitter and base electrodes, respectively, of said switching transistors, and wherein said first and second output signals are provided at collector electrodes of said first and second switching transistors, respectively.

3. A differential amplifier as set forth in claim 2 including first output switching means having a gate electrode connected to the collector electrode of said first switching transistor and controlled by said first output signal to enable said first output switching means, and second output switching means having a gate electrode connected to the collector electrode of said second switching transistor and controlled by said second output signal to enable said second output switching means.

4. A differential amplifier as set forth in claim 1 wherein said first and second output electrodes comprise collector electrodes of said input transistors, said which and second control electrodes comprise base electrodes for receiving variable input signals, and said first and second input transistors further include first and second emitter electrodes, respectively, commonly connected to said constant current source. the collectors at the second 5. A differential amplifier for comparing first and second input signals and providing output signals which indicate amplitude and polarity differences between the compared signals, said amplifier comprising an input stage with a first input transistor having a first control electrode connected to receive said first input signal, and a first output electrode, and a second input transistor having a second control electrode connected to receive said second input signal, and a second output electrode, means biasing said first and second input transistors to be normally conducting for amplifying said first and second input signals to provide amplified signals at said first and second output electrodes, respectively, and an output stage including a first switching transistor having a base electrode connected to said second output electrode and an emitter electrode, and a second switching transistor having a base electrode connected to said first output electrode and an emitter electrode, a first drive transistor having a base-emitter circuit connected between the first output electrode and the emitter electrode of said first switching transistor, and a second drive transistor having a base-emitter circuit connected between said second output electrode and the emitter electrode of said second switching transistor, and means normally reverse biasing said first and second switching transistors, one of said switching transistors becoming forward biased to provide a first output signal at a collector electrode thereof whenever one of said input signals increases a predetermined amount relative to the other one of said input signals such that the amplitude of the amplified signal provided at said first output electrode is a given amount greater than the amplitude of the amplified signal provided at said second output electrode, and the other one of said switching transistors becoming forward biased to provide a second output signal at a collector electrode thereof whenever said one input signal decreases said predetermined amount relative to said other input signal such that the amplitude of the amplified signal provided at said second output electrode is a given amount greater than the amplitude of the amplified signal provided at said first output electrode.

6. A differential amplifier for comparing first and second input signals each of which is variable in amplitude and polarity and indicate amplitude providing output signals which indicate amplitude and polarity differences between the compared signals, said amplifier comprising an input stage with first and second input transistors each having an emitter, a base, and a collector, said emitters being commonly connected to constant current source, first means for providing a first input signal which is variable in amplitude and polarity at the base of said first input transistor, second means for providing a second input signal which is variable in amplitude and polarity at the base of said second input transistor, said constant current source extending a constant current to the bases of said first and second input transistors to enable a potential difference of one polarity to be established between the collectors of said first and second input transistors whenever the input signal provided at the base of one of said input transistors increases relative to the input signal provided at the base of the other input transistor, and a potential difference of the opposite polarity to be established between the collectors of said first and second input transistors whenever the input signal provided at the base of said one input transistor decreases relative to the input signal provided at the base of the other input transistor, and an output stage including first and second switching transistors each having an emitter, a base, and a collector, the emitter and the base of the first switching transistor being connected to the collectors of said first and second input transistors, respectively, and the emitter and the base of the second switching transistor being connected to the collectors of the second and first input transistors, respectively, and means normally reverse biasing said first and second switching transistors, said first switching transistor becoming forward biased and said second switching transistor remaining reverse biased to provide a first output signal whenever the input signal provided at the base of said first input transistor increases by at least a given amount relative to the input signal provided at the base of the second input transistor, and said first switching transistor remaining reverse biased and said second switching transistor becoming forward biased to provide a second output signal whenever said input signal provided at the base of the first input transistor decreases by at least said given amount relative to the input signal provided at the base of said second input transistor.

7. A differential amplifier for comparing first and second input signals each of which is variable in amplitude and polarity and providing output signals which indicate amplitude and polarity differences between the compared signals, said amplifier comprising an input stage with a first input transistor having a first control electrode, and a first output electrode, and a second input transistor having a second control electrode, and a second output electrode, first means for extending to said first control electrode a first input signal which is variable in amplitude and polarity at said first control electrode, second means for extending to said second control electrode a second input signal which is variable in amplitude and polarity at said second control electrode, bias means for biasing said first and second input transistors to be normally conducting for amplifying said first and second variable input signals to provide amplified signals at said first and second output electrodes, respectively, said bias means including a constant current source for supplying a constant current to said first and second input transistors such that said amplified signals provided by said input transistors establish a potential difference of one polarity between the first and second output electrodes whenever the input signal extended to the control electrode of one of said input transistor increases relative to the input signal extended to the control electrode of the other input transistor and a potential difference of the opposite polarity whenever the input signal extended to the control electrode of said one input transistor decreases relative to the input signal extended to the control electrode of the other input transistor, and an output stage including a first switching transistor having first and second input electrodes connected to said first and second output electrodes, respectively, and a second switching transistor having first and second input electrodes connected to said second and first output electrodes, resepctively, and means normally biasing said first and second switching transistors to a first conductive state, one of said switching transistors becoming biased to a second conductive state to provide a first output signal whenever one of said input signals increases a predetermined amount relative to the other one of said input signals such that the amplitude of the amplified signal provided at said first output electrode is a given amount greater than the amplitude of the amplified signal provided at said second output electrode, and the other switching transistor becoming biased to said second conductive state to provide a second output signal whenever said one input signal decreases said predetermined amount relative to said other input signal such that the amplitude of the amplified signal provided at said second output electrode is a given amount greater than the amplitude of the amplified signal provided at said first output electrode.

* * * * *

PO-1050
(5/69)

UNITED STATES PATENT OFFICE
CERTIFICATE OF CORRECTION

Patent No. 3,849,674            Dated November 19, 1974

Inventor(s) Robert G. Nettles

It is certified that error appears in the above-identified patent and that said Letters Patent are hereby corrected as shown below:

Column 13, line 17, "which" should be -- first --;

lines 21 and 22, cancel "the collectors at the second";

line 67, after "and" insert -- for --;

same line, "indicate amplitude" should be deleted.

Signed and sealed this 11th day of March 1975.

(SEAL)
Attest:

RUTH C. MASON
Attesting Officer

C. MARSHALL DANN
Commissioner of Patents
and Trademarks